United States Patent
Lambert et al.

(10) Patent No.: US 9,358,926 B2
(45) Date of Patent: *Jun. 7, 2016

(54) MANAGING THE CAMERA ACQUIRING INTERIOR DATA

(71) Applicant: Lytx, Inc., San Diego, CA (US)

(72) Inventors: Daniel Lambert, Carlsbad, CA (US); John Van Nortwick, Leesburg, VA (US); Michael Shirey, San Diego, CA (US)

(73) Assignee: Lytx, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/559,812

(22) Filed: Dec. 3, 2014

(65) Prior Publication Data

US 2015/0183372 A1    Jul. 2, 2015

Related U.S. Application Data

(63) Continuation of application No. 13/951,719, filed on Jul. 26, 2013, now Pat. No. 8,930,072.

(51) Int. Cl.
  *G06F 7/00* (2006.01)
  *B60R 1/00* (2006.01)
  *G07C 5/08* (2006.01)
  *G07C 5/00* (2006.01)

(52) U.S. Cl.
  CPC . *B60R 1/00* (2013.01); *G07C 5/008* (2013.01); *G07C 5/0866* (2013.01)

(58) Field of Classification Search
  CPC ............... G06T 5/006; H04N 5/23216; H04N 5/23238; H04N 5/23296; H04N 5/2628
  USPC ............... 701/36; 348/222.1, 333.01, 333.11; 379/142.06
  See application file for complete search history.

(56) References Cited

U.S. PATENT DOCUMENTS

| | | | |
|---|---|---|---|
| 2004/0138794 | A1 | 7/2004 | Saito et al. |
| 2009/0096937 | A1* | 4/2009 | Bauer et al. ............ 348/739 |
| 2010/0060734 | A1 | 3/2010 | Chou |
| 2010/0103265 | A1 | 4/2010 | Yu et al. |
| 2010/0211770 | A1 | 8/2010 | Alrabady et al. |
| 2011/0169625 | A1* | 7/2011 | James et al. ............ 340/439 |
| 2013/0073114 | A1 | 3/2013 | Nemat-Nasser et al. |

FOREIGN PATENT DOCUMENTS

| | | |
|---|---|---|
| DE | 102004020255 A1 | 9/2005 |
| JP | H08265611 A | 10/1996 |

OTHER PUBLICATIONS

Main Features Night view recording with Infra-Red Light, Jan. 1, 2012, XP055237793, Retrieved from the Internet: URL:http://www.roadhawk.co.uk/software/RoadHawk-RH-2MANUAL.pdf [retrieved on Dec. 21, 2015].

* cited by examiner

*Primary Examiner* — McDieunel Marc
(74) *Attorney, Agent, or Firm* — Van Pelt, Yi & James LLP

(57) ABSTRACT

A system for managing a camera is comprises an input interface configured to detect a change in state; a processor configured to block transfer of data from an inward facing video camera; and an output interface configured to indicate that transfer of data is blocked.

24 Claims, 6 Drawing Sheets

MANAGING THE CAMERA ACQUIRING INTERIOR DATA

CROSS REFERENCE TO OTHER APPLICATIONS

This application is a continuation of a U.S. patent application Ser. No. 13/951,719, issued as U.S. Pat. No. 8,930,072, entitled MANAGING THE CAMERA ACQUIRING INTERIOR DATA filed Jul. 26, 2013 which is incorporated herein by reference for all purposes.

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. Sensor data can then be transmitted to an external reviewing system. Some vehicle event recorder systems include both an outward-facing camera (e.g., to capture images of the road) and an inward-facing camera (e.g., to capture images of the driver). In some circumstances, for the operation of the vehicle event recorder, the inward facing camera presents problems.

BRIEF DESCRIPTION OF THE DRAWINGS

Various embodiments of the invention are disclosed in the following detailed description and the accompanying drawings.

DETAILED DESCRIPTION

Figure 1:
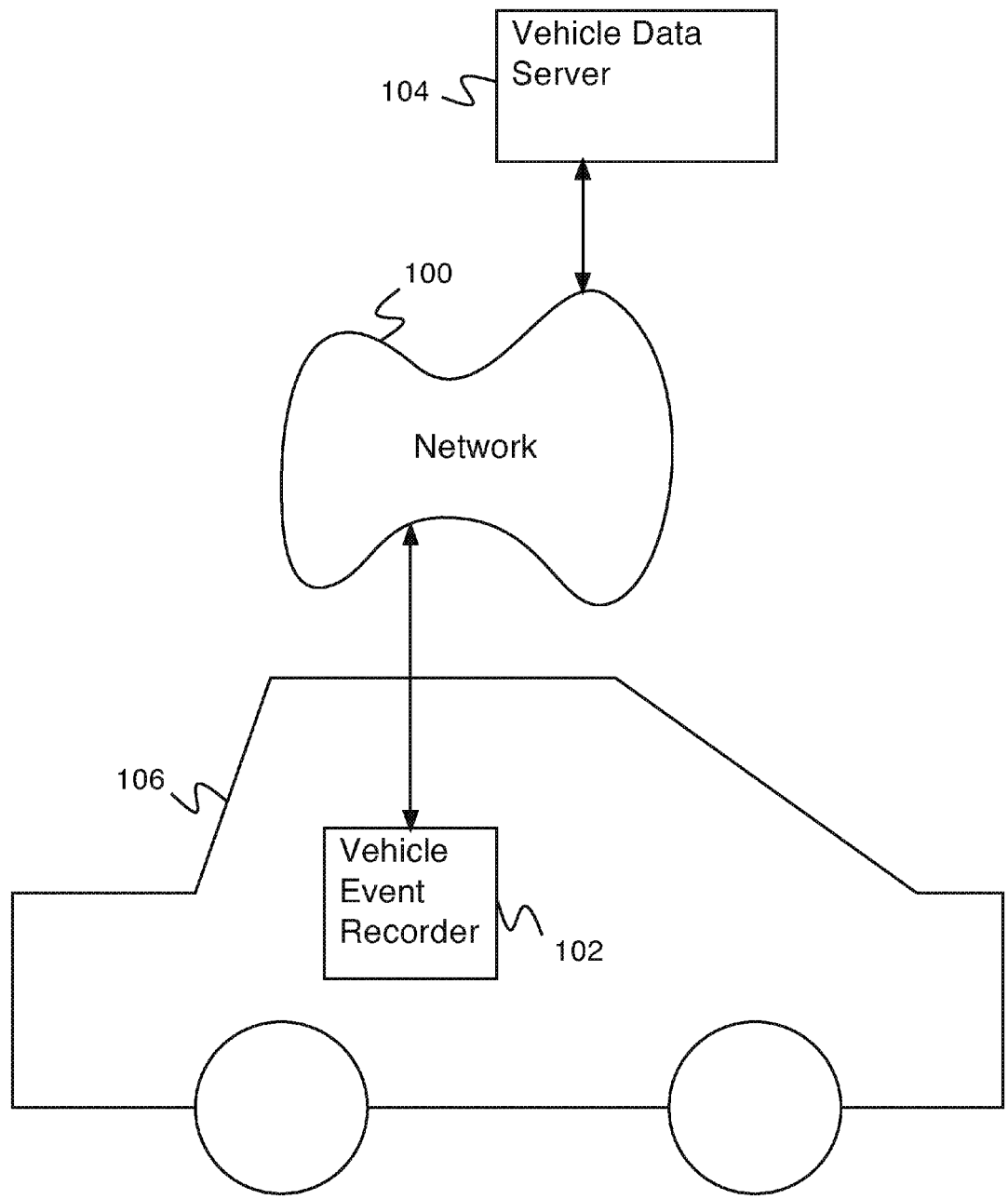
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for managing a camera is disclosed. A system for managing a camera comprises an input interface configured to detect a change in state; a processor configured to block transfer of data from an inward facing video camera; and an output interface configured to indicate that transfer of data is blocked. The system for managing a camera additionally comprises a memory coupled to the processor and configured to provide the processor with instructions.

In various embodiments, the driver image comprises a human viewable image, a machine data image (e.g., a set of facial feature data, a set of extracted facial geometric feature data, etc.), or any other appropriate driver image. In various embodiments, blocking transfer of the driver image comprises not transferring the image (e.g., from the camera to a memory, from a recorder to a server, etc.), not saving the image to a non-transitory memory (e.g., in a memory that is not a transitory memory such as a non-buffer only type memory, etc.), or any other appropriate manner of blocking. In some embodiments, a vehicle event recorder mounted on a vehicle records anomalous vehicle events. Anomalous vehicle event types include accidents, speed limit violations, rough road events, hard maneuvering events (e.g., hard cornering, hard braking), dangerous driving events (e.g., cell phone usage, eating while driving, working too long of a shift, sleepy driving, etc.), and any other appropriate kind of anomalous vehicle events. When anomalous vehicle events occur, sensors (video recorders, audio recorders, accelerometers, gyroscopes, vehicle state sensors, GPS, etc.) record anomalous vehicle event data associated with the event. The event is stored on the vehicle event recorder associated with the event data. Events are transmitted to a vehicle data server for review and long-term storage.

In some embodiments, some vehicle event recorders include both an outward-facing (e.g., road-facing) camera and an inward-facing (e.g., driver-facing camera). The outward-facing camera observes the events on the road, including other cars, traffic lights, pedestrians, etc. The inward-facing camera observes the driver, in order to identify the driver and to observe signs of driver inattentiveness (e.g., yawning, excessive blinking, or other signs of drowsiness; eating; cell phone usage; not checking the mirrors; etc.). In some embodiments, the inward-facing camera provides important data for determining driver safety and is valuable to the driver management. In some cases, a driver and/or organizations of drivers (e.g., unions) may prefer not to be recorded by an inward facing camera for privacy and/or other reasons. In some cases, there may be legal prohibitions against the capturing and/or storing of images of employees while on the job for certain purposes (e.g., a state or country may prohibit the use of images for some purposes—for example, for uses against employees). In some embodiments, in the event that a driver is recorded but prefers not to be recorded, disabling the camera can be offered as a reward for good driving (e.g., after collecting sufficient good driving tokens/points). In some embodiments, a probation period comprises a period when the inward facing camera is not blocked or follows different rules as compared to a non-probation period. In some embodiments, the driver cannot be legally recorded and in those cases the camera must be disabled.

In some embodiments, when a change of driver is noted, it is then necessary to identify the new driver, and in some cases it is determined if the driver's image should be recorded, and if the driver's image is determined that it should not be recorded, then the camera is disabled and/or the images from the camera are not stored. The disabling of the camera can also be indicated to the driver so that the driver knows that he is not being imaged.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, video recorders (e.g., vehicle interior facing recorder, vehicle exterior facing recorder, driver facing recorder, etc.), audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises map data. In some embodiments, vehicle event recorder 102 comprises a system for detecting risky behavior. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a CDMA network, a GSM network, a local area network, a wide area network, the Internet, universal mobile telecommunications system (UMTS), long term evolution (LTE), worldwide interoperability for microwave access (WiMax), integrated digital enhanced network (iDEN), or any other appropriate network. In some embodiments, network 100 comprises multiple networks, changing over time and location. Vehicle event recorder 102 communicates with vehicle data server 104 via network 100. Vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data.

In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly. In some embodiments, vehicle event recorder 102 comprises a system for managing a camera.

Figure 2:
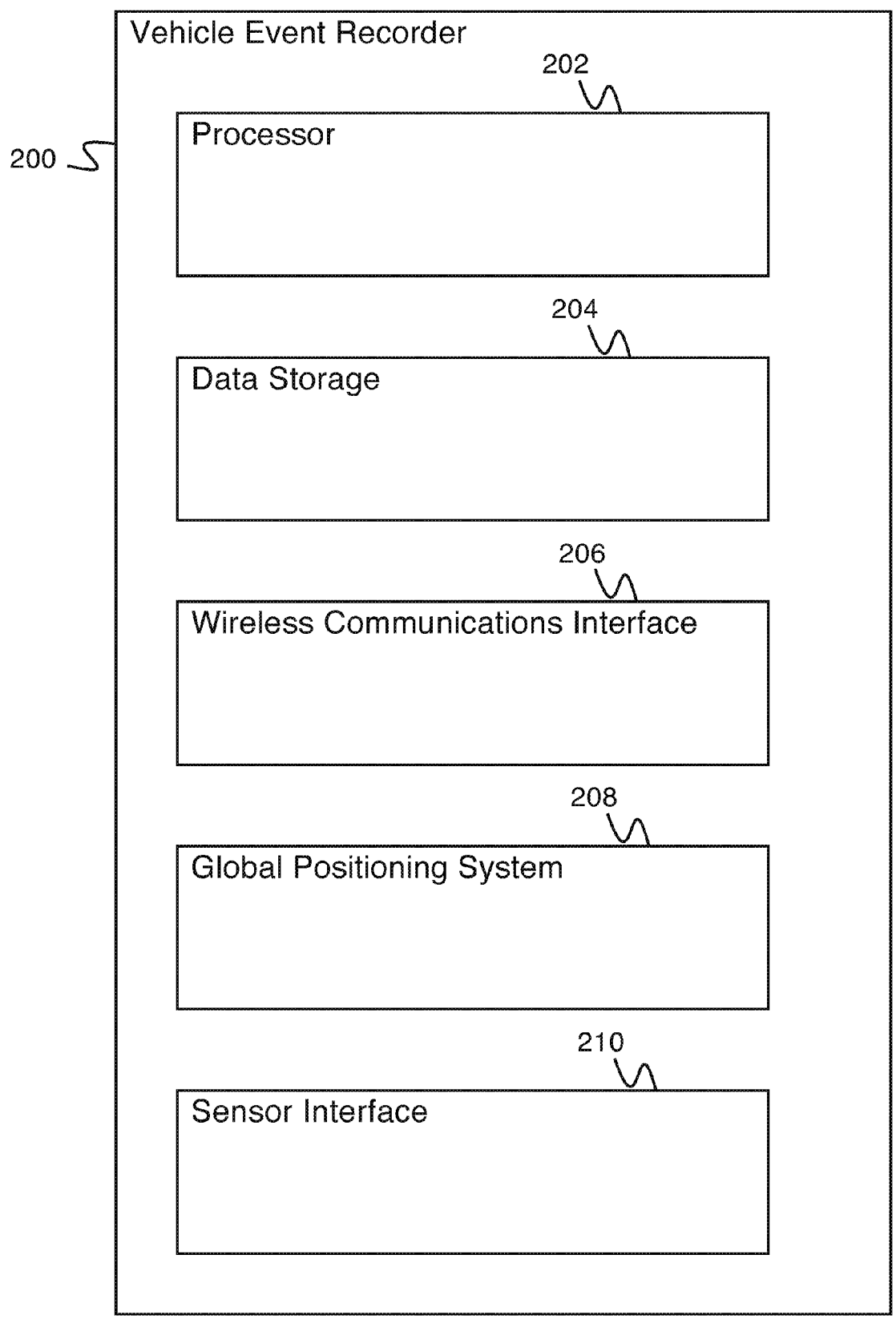
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, for determining a position using global positioning system 208, and for reading data via sensor interface 210. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, map data, or any other appropriate data. In various embodiments, wireless communications interface 206 comprises one or more of a global system for mobile communication (GSM) interface, a code division multiple access (CDMA) interface, a wireless internet connection (e.g., WiFi) interface, or any other appropriate interface. Global positioning system 208 comprises a global positioning system (e.g., GPS) for determining a system location. Sensor interface 210 comprises an interface to one or more vehicle event recorder sensors. In various embodiments, vehicle event recorder sensors comprise an external video camera, an internal video camera, a microphone, an accelerometer, a gyroscope, an outdoor temperature sensor, a moisture sensor, a laser line tracker sensor, vehicle state sensors, a sensor in an event recorder housing, an original equipment manufacturer sensor, a $3^{rd}$ party aftermarket sensor, or any other appropriate sensors. In various embodiments, vehicle state sensors comprise a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, sensor interface 210 comprises an on-board diagnostics (OBD) bus. In some embodiments, vehicle event recorder 200 communicates with vehicle state sensors via OBD bus.

Figure 3:
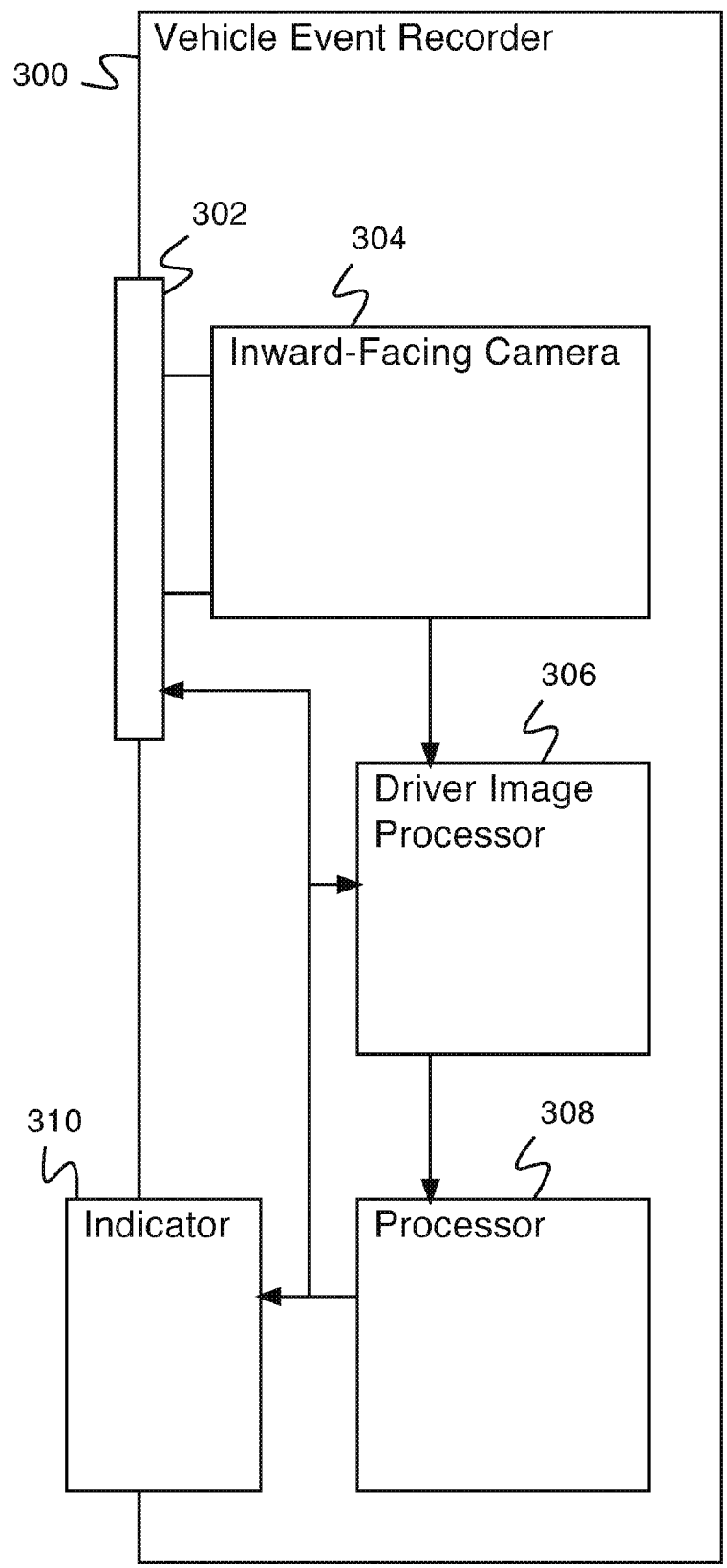
FIG. 3 is a block diagram illustrating an embodiment of an inward-facing camera system of a vehicle event recorder.

FIG. 3 is a block diagram illustrating an embodiment of an inward-facing camera system of a vehicle event recorder. In some embodiments, vehicle event recorder 300 comprises vehicle event recorder 102 of FIG. 1. In the example shown, inward-facing camera 304 comprises an inward-facing camera (e.g., an inward-facing camera interfaced to sensor interface 210 of FIG. 2). In some embodiments, inward-facing camera 304 records images of a driver. In some embodiments, light for forming images of a driver in inward-facing camera 304 pass through shutter 302. In some embodiments, shutter 302 receives a disable signal indicating that shutter 302 should close and prevent light conveying images of the driver to pass through. Image data is transferred from inward facing camera 304 to driver image processor 306. In some embodiments, driver image processor 306 provides driver image data to processor 308. Driver image processor 306 processes the driver image data. In some embodiments, driver image processor 306 comprises part of processor 308. In some embodiments, driver image processor 306 receives a disable signal indicating it should block the transfer of the driver image. In various embodiments, blocking the transfer of the driver image comprises not transferring the driver image, blocking a face image, blurring a face image, indicating that the data is not to be uploaded, or not transferring the driver image in any other appropriate way. In some embodiments, driver image processor 306 comprises a driver facial geometry processor for determining driver facial geometry. In some embodiments, driver image processor 306 provides facial geometry data to processor 308. In some embodiments, in the event that driver image processor 306 blocks the transfer of a driver image to processor 308, it still provides facial geometry data to processor 308.

Processor 308 receives the driver image and/or facial geometry data from driver image processor 306. In some embodiments, processor 308 comprises processor 202 of FIG. 2. In various embodiments, processor 308 stores the driver image or causes the driver image to be stored (e.g., using a memory, a database, a storage unit coupled to processor 308, etc.), transmits the driver image, processes the driver image, or takes any other appropriate action with the driver image. Processor 308 additionally determines if transfer of the driver image should be blocked. In the event processor 308 determines that transfer of the driver image should be blocked, it sends a block driver image signal to shutter 302, driver image processor 306, and/or indicator 310. Indicator 310 comprises an indicator for indicating to the driver that transfer of the driver image is blocked.

Figure 4:
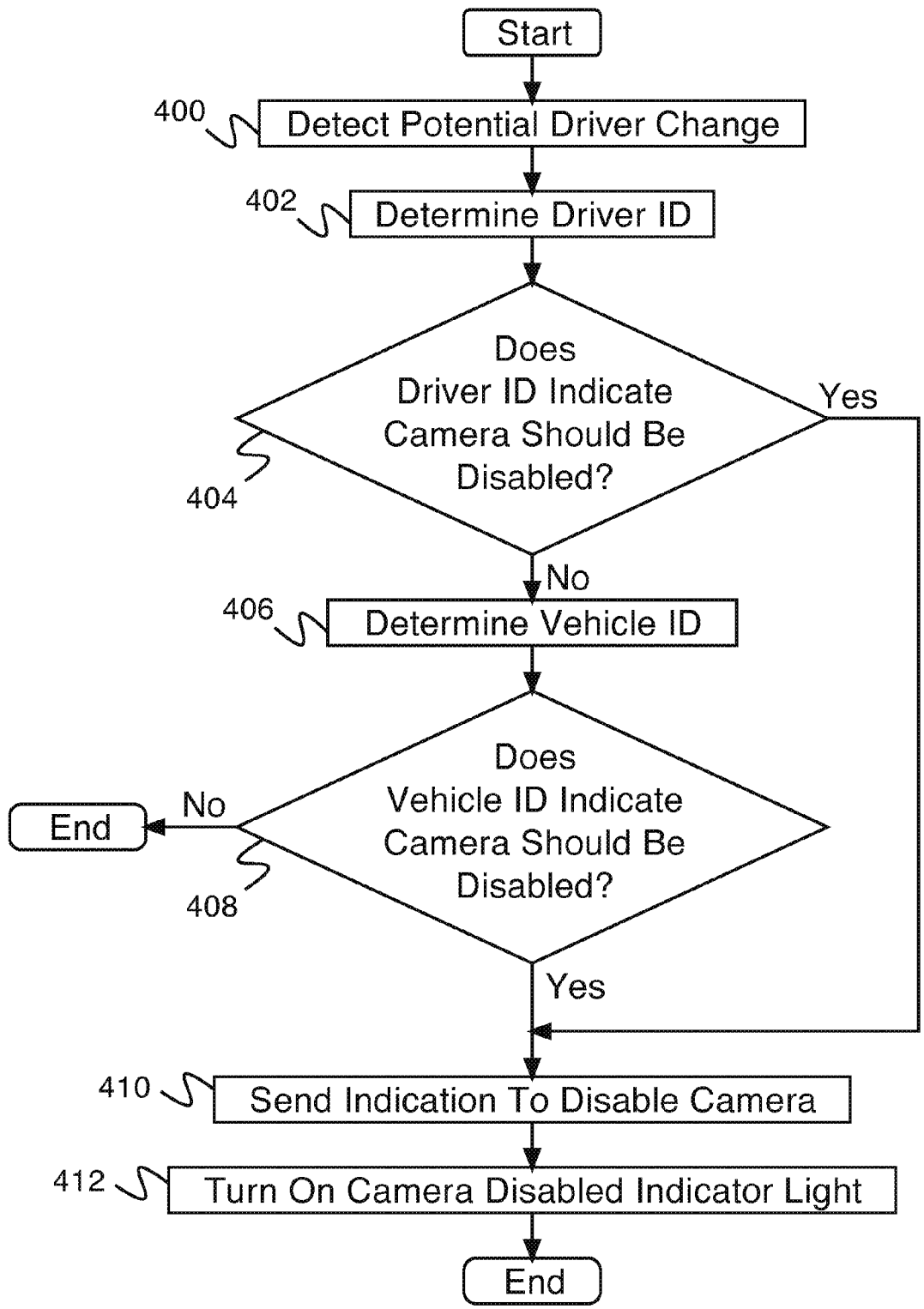
FIG. 4 is a flow diagram illustrating an embodiment of a process for managing a camera.

FIG. 4 is a flow diagram illustrating an embodiment of a process for managing a camera. In some embodiments, the process of FIG. 4 is executed by processor 202 of FIG. 2. In the example shown, in 400, a potential driver change is detected. In various embodiments, a potential driver change is detected by a driver seat weight sensor, by an inward-facing camera, by an accelerometer, by a processor reading a driver schedule, EOBR update, RFID, card reader, biometric inputs such as finger prints or retinal scan, facial geometry techniques to include all analysis spectrum (e.g., visible, IR, thermal, etc.), or by any other appropriate sensor or processor. In 402, a driver ID is determined. In various embodiments, a driver ID (e.g., an identifier) is determined from a driver schedule, from a driver image, or in any other appropriate way. In 404, it is determined whether the driver ID indicates that the camera should be disabled. In some embodiments, determining whether the driver ID indicates that the camera should be disabled comprises looking the driver ID up in a database and determining whether an indication is stored associated with the driver ID indicating that the camera should be disabled. In some embodiments, whether the driver ID indicates that the camera should be disabled can be determined directly from the driver ID (e.g., the driver ID includes an indication of the driver home state and/or country, and only drivers with certain home states and/or countries should have the camera disabled). In various embodiments, the driver ID data is on the vehicle event recorder, the backend server (e.g., a web service, a backend database, etc.), or any other appropriate storage location that can be contacted to obtain a driver ID. In some embodiments, determining whether the driver ID indicates the camera should be disabled is based at least in part on a driver safety score. In various embodiments, the driver score comprises a score calculated from driver violations, driver performance measures, driver event recorder events, proprietary scores (e.g., driver score developed by DriveCam, Inc, a third party score such as Compliance, Safety, Accountability score (CSA driver score), etc.), or any other appropriate driver evaluation score. In some embodiments, determining whether the driver ID indicates the camera should be disabled is based at least in part on a driver's on the clock status (e.g., when a driver is off-the clock, the camera is disabled; when the driver is on the clock, the camera is enabled). In some embodiments, determining whether the driver ID indicates the camera should be disabled is based at least in part on a driver legal status. In the event the driver ID indicates the camera should not be disabled, control passes to 406. In the event the driver ID indicates the camera should be disabled, control passes to 410.

In 406, the vehicle ID is determined. In some embodiments, the vehicle ID is determined by querying a stored vehicle ID. In various embodiments, the vehicle ID comprises an event recorder (ER) serial number, a vehicle identification number (VIN), a VIN based number on an electronic computation unit (ECU), an ECU identifier, or any other appropriate identifier. In 408, it is determined whether the vehicle ID indicates the camera should be disabled. In some embodiments, determining whether the vehicle ID (e.g., an identifier) indicates that the camera should be disabled comprises looking the vehicle ID up in a database and determining whether an indication is stored associated with the vehicle indicating that the camera should be disabled. In some embodiments, whether the vehicle ID indicates that the camera should be disabled can be determined directly from the vehicle ID (e.g., the vehicle ID includes an indication of the vehicle home state and/or country, and only drivers with certain home states and/or countries should have the camera disabled). In some embodiments, determining whether the vehicle ID indicates the camera should be disabled is based at least in part on a vehicle legal status. In some embodiments, determining whether the camera should be disabled is based at least in part on a geographic zone (e.g., a location, a country, a county, a state, a district, a province, etc.). In the event the vehicle ID indicates the camera should not be disabled, the process ends. In the event the vehicle ID indicates the camera should be disabled, control passes to 410. In some embodiments, in addition to determining if a driver ID indicates that the camera should be disabled and determining if a vehicle ID indicates that the camera should be disabled, the process determines if an electronic on-board recorder (EOBR) state indicates that the camera should be disabled.

In 410, an indication to disable the camera is sent. In some embodiments, the indication to disable the camera is sent to a shutter, where the shutter is used to disable the camera by blocking light to the camera input lens. In some embodiments, the indication to disable the camera is sent to a driver image processor, where the driver image processor is used to disable the storage and/or transfer of an image from the camera. In some embodiments, the indication to disable the camera is sent to the camera, where the camera uses the indication to disable image storing, transferring, or taking capabilities (e.g., by disabling electronic circuits, imaging circuits, etc.) to disable the imaging capabilities of the camera. In 412, the camera disabled indicator light is turned on. In some embodiments, the camera disabled indicator light is turned on by an indication to disable the camera. In some embodiments, the camera disabled indicator light indicates that the camera is not able to take, store, and/or transfer an image.

Figure 5:
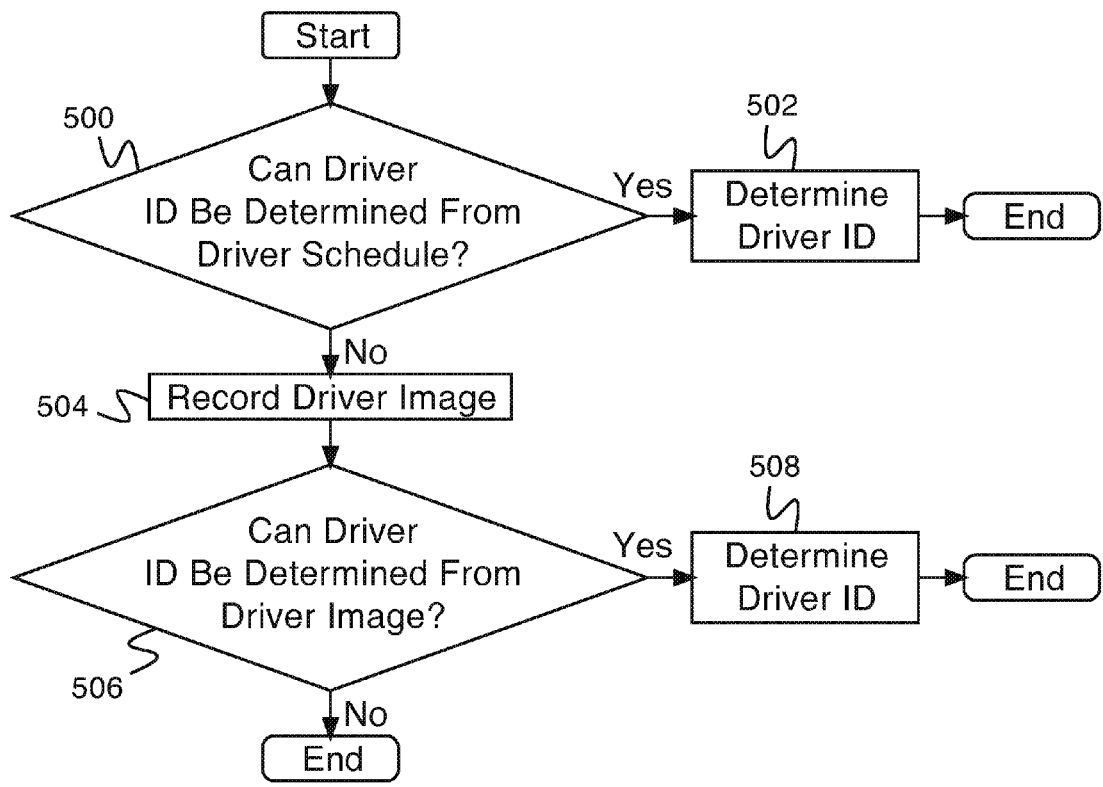
FIG. 5 is a flow diagram illustrating an embodiment of a process for determining a driver ID.

FIG. 5 is a flow diagram illustrating an embodiment of a process for determining a driver ID. In some embodiments, the process of FIG. 5 implements 402 of FIG. 4. In the example shown, in 500, it is determined whether the driver ID can be determined from the driver schedule. If it is determined that the driver ID can be determined from the driver schedule, control passes to 502. In 502, the driver ID is determined, and the process ends. If it is determined in 500 that the driver ID cannot be determined from the driver schedule, control passes to 504. In 504, a driver image is recorded. In some embodiments, recording a driver image comprises recording a single frame from an inward-facing camera. In some embodiments, multiple images are recorded in order to insure sufficient images are recorded to identify the driver (e.g., a non-obscured image, an image that facial recognition software is able to process and properly identify the face in a database, an image from which facial parameters are able to be determined, etc.). In 506, it is determined whether the driver ID can be determined from the driver image. If it is determined that the driver ID can be determined from the driver image, control passes to 508. In 508, the driver ID is determined, and the process ends. If it is determined in 506 that the driver ID cannot be determined from the driver image, the process ends. In some embodiments, in the event that the driver ID cannot be determined from the driver image, the driver ID is determined in another manner (e.g., a radio frequency identifier (e.g., RFID), other card reader, etc.). In some embodiments, if the driver ID cannot be determined either from the driver schedule or the driver image, when determining whether the driver ID indicates that the camera should be disabled, it is assumed that the camera should be disabled. In some embodiments, if the driver ID cannot be determined either from the driver schedule or the driver image, when determining whether the driver ID indicates that the camera should be disabled, it is assumed that the camera should not be disabled.

Figure 6:
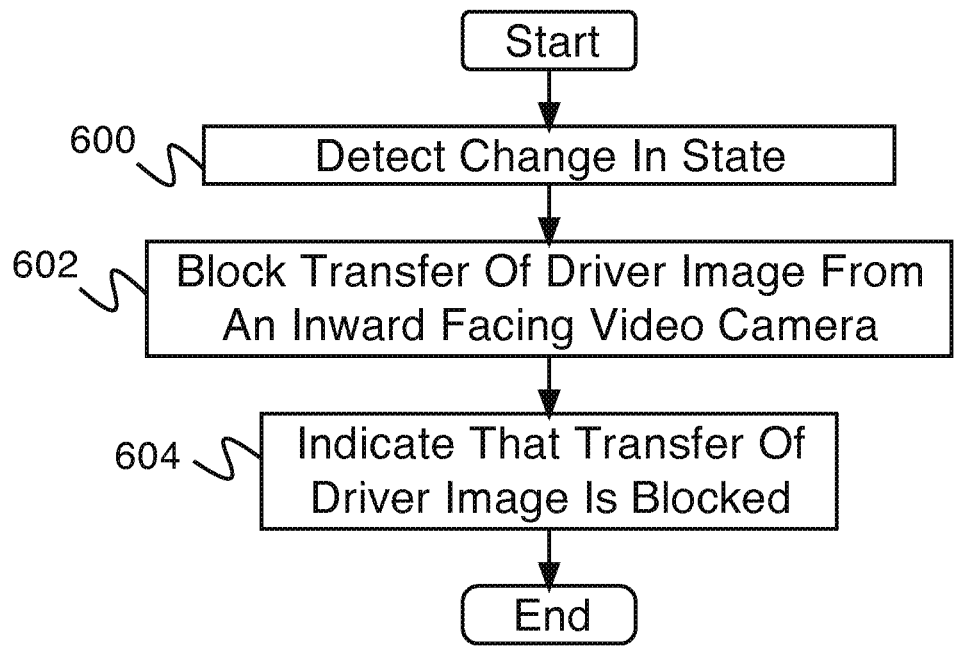
FIG. 6 is a flow diagram illustrating an embodiment of a process for managing a camera.

FIG. 6 is a flow diagram illustrating an embodiment of a process for managing a camera. In some embodiments, the process of FIG. 6 is executed by vehicle event recorder 102 of FIG. 1. In the example shown, in 600, a change in state is detected. In various embodiments, the state change comprises one or more of the following: a change in state associated with a driver ID associated with the driver of the vehicle, the state changes to a good driver state (e.g., a driver with a good driving record), the state changes to legal prohibition (e.g., a state of being subject to legal/contract prohibition) a change in an output of a driver weight sensor, a change detected using an inward facing video camera (e.g., a new facial image is detected), or any other appropriate change of state. In various embodiments, a state change comprises: a change from a good state to a bad state, a change from a bad state to a good state, a duty status change (e.g., a change per explanation of benefits (EOB)), a change from a driver triggered event capture (e.g., a good driver without interior video on, triggers a video with either an external trigger button or ER manual button—for example, use case is a good transit driver with interior lens off uses external trigger when they feel threatened by a passenger), a driver reward change (e.g., driver is rewarded based on a recent drives—for example, a token system with tokens redeemable for interior lens block for a period of time, where N tokens are rewarded per X hours of good driving), driver probation change (e.g., interior lens is on because of a probation period due to one of following: new hire, disciplinary action), a state change for behavior based a decision because there is a default to off and turn on for negative behaviors or default to on and turn off for positive behaviors, or any other appropriate state change. In 602, transfer of a driver image from an inward-facing video camera is blocked. In various embodiments, the blocking of the image from the inward-facing camera comprises one or more of the following: physically blocking the light from entering the camera (e.g., using a shutter), electronically disabling the camera, not storing the image, not transferring the image, deleting a stored image permanently, identifying a face in an image and fuzzing/greying/obscuring that portion of the image, blocking transfer to a third party but not to employer, blocking image transfer to coach but allow legal department access (e.g., for collision legal handling), blocking human viewable images but allow algorithmic capture for images (e.g., machine vision data such as facial geometry), or any other appropriate image blocking technique. In 604, transfer of the driver image is indicated to be blocked.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for managing a camera, comprising:
an input interface configured to:
detect a change in state;
a processor configured to:
determine whether to block transfer of an image of a driver based at least on the change in state, wherein the driver image is captured by the camera; and
responsive to a determination to block transfer of the driver image, block transfer of the driver image from the camera to a recording device; and
an output interface configured to:
indicate that transfer of the driver image to the recording device is blocked.

2. The system of claim 1, additionally comprising a physical shutter for blocking the camera.

3. The system of claim 1, wherein the output interface comprises an indicator light for indicating that the transfer of the driver image is blocked.

4. The system of claim 1, wherein the input interface comprises a driver weight sensor.

5. The system of claim 1, wherein the input interface comprises the camera.

6. The system of claim 1, wherein the blocking transfer of the driver image comprises closing a shutter.

7. The system of claim 1, wherein the blocking transfer of the driver image comprises blurring at least a portion of the driver image.

8. The system of claim 1, wherein the blocking transfer of the driver image comprises not saving the driver image to a non-transitory memory.

9. The system of claim 1, wherein the blocking transfer of the driver image comprises blocking a face image captured by the camera.

10. The system of claim 1, wherein the blocking transfer of the driver image comprises indicating that data is not to be uploaded.

11. The system of claim 1, wherein the change in state comprises a change in a driver ID associated with the driver of a vehicle.

12. The system of claim 1, wherein the determining whether to block transfer of the driver image is based at least in part on a driver ID state.

13. The system of claim 12, wherein the driver ID state is determined from one or more of the following: a driver schedule, a driver image, a RFID, and/or a card swipe.

14. The system of claim 1, wherein the determining whether to block transfer of the driver image is based at least in part on a vehicle ID state.

15. The system of claim 1, wherein the determining whether to block transfer of the driver image is based at least in part on an electronic on-board recorder state.

16. The system of claim 1, wherein the determining whether to block transfer of the driver image is based at least in part on a driver score.

17. The system of claim 1, wherein the determining whether to block transfer of the driver image is based at least in part on a driver's on the clock status.

18. The system of claim 1, wherein the determining whether to block transfer of the driver image is based at least in part on a driver legal status.

19. The system of claim 1, wherein the determining whether to block transfer of the driver image is based at least in part on a vehicle legal status.

20. The system of claim 1, wherein the determining whether to block transfer of the driver image is based at least in part on a probation.

21. The system of claim 1, wherein the processor is additionally configured to determine facial geometry data.

22. The system of claim 1, wherein the determining whether to block transfer of the driver image is based at least in part on compliance with privacy regulations.

23. A method for managing a camera, comprising:
 detecting a change in state;
 determining whether to block transfer of an image of a driver based at least on the change in state, wherein the driver image is captured by the camera;
 responsive to a determination to block transfer of the driver image, blocking, using a processor, transfer of the driver image from the camera to a recording device; and
 indicating that transfer of the driver image to the recording device is blocked.

24. A computer program product for managing a camera, the computer program product being embodied in a tangible computer readable storage medium and comprising computer instructions for:
 detecting a change in state;
 determining whether to block transfer of an image of a driver based at least one rules for the change in state, wherein the image of the driver is captured by the camera;
 responsive to a determination to block transfer of the driver image, blocking transfer of the driver image from the camera to a recording device; and
 indicating that transfer of the driver image to the recording device is blocked.

* * * * *